(12) United States Patent
Shimizu et al.

(10) Patent No.: US 6,223,722 B1
(45) Date of Patent: May 1, 2001

(54) APPARATUS AND METHOD FOR CONTROLLING AN IGNITION TIMING IN AN INTERNAL COMBUSTION ENGINE

(75) Inventors: Hirokazu Shimizu; Yukio Hoshino, both of Atsugi (JP)

(73) Assignee: Unisia Jecs Corporation, Atsugi (JP)

(*) Notice: Subject to any disclaimer, the term of this patent is extended or adjusted under 35 U.S.C. 154(b) by 0 days.

(21) Appl. No.: 09/379,631

(22) Filed: Aug. 24, 1999

(30) Foreign Application Priority Data

Aug. 24, 1998 (JP) .................................... 10-237656

(51) Int. Cl.$^7$ ................. F02P 3/045; F02P 5/15
(52) U.S. Cl. ..................... 123/406.18; 123/609
(58) Field of Search ............... 123/406.18, 632, 123/146.5 D, 609

(56) References Cited

U.S. PATENT DOCUMENTS 5,060,614 * 10/1991 Uchimi et al. .................. 123/406.18

FOREIGN PATENT DOCUMENTS 63-198740 * 8/1988 (JP) .................................. 123/406.76

* cited by examiner

Primary Examiner—Andrew M. Dolinar
(74) Attorney, Agent, or Firm—Foley & Lardner

(57) ABSTRACT

An apparatus for controlling ignition timing in an internal combustion engine includes a cam sensor for generating a standard position signal for each standard piston position, a position sensor for generating a single angle signal, a control unit for controlling ignition timing based on the standard position signal and the single angle signal, a timer for detecting a time from the standard position signal before the ignition timing, and a device for setting an ignition-starting timing after said standard position signal when an engine rotation speed is less than a predetermined rotation speed.

6 Claims, 4 Drawing Sheets

APPARATUS AND METHOD FOR CONTROLLING AN IGNITION TIMING IN AN INTERNAL COMBUSTION ENGINE

BACKGROUND OF THE INVENTION

1. Field of the Invention

The present invention relates in general to an apparatus and method for controlling ignition timing in an internal combustion engine, and more particularly to a technique for detecting current control timing by determining a time from a standard position signal.

2. Description of the Related Art

In general, a cam sensor or a crank angle sensor is installed in an internal combustion engine and outputs a detecting signal for controlling ignition timing based on a standard piston position of each cylinder. Ignition timing is controlled by generating reference position signals based on the detecting signals output by these sensors.

Specifically, an engine load or an engine rotation speed decides ignition timing. On the other hand, a battery voltage decides an ignition time, which is converted into an energization angle based on the engine rotation speed. As a result, an ignition-starting timing is decided by ignition timing before the energization angle.

When a sensor outputting a single-angle signal for each single crank angle is installed in connection with the cam sensor or the crank angle sensor, the ignition-starting timing and the ignition timing are detected by counting the number of single-angle signals.

When the sensor outputting a single-angle signal has trouble or is not installed, the ignition-starting timing and the ignition timing cannot be determined by counting the number of single-angle signals after a reference position signal. Instead, the ignition timing is controlled based on the engine rotation speed. Passing/interrupting a current through an ignition coil is controlled by control timing, which is detected by counting time from a reference position signal.

When an ignition-starting timing to the ignition coil is decided by the ignition time and an energization angle, which is before the reference position signal just before the ignition timing, the ignition-starting timing is detected by counting a time from a previous reference position signal, i.e., a reference position signal just before the ignition timing. When the ignition coil is energized, the time at which current to the ignition coil is interrupted (i.e., the ignition timing) is determined by counting a time from a reference position signal REF just before the ignition timing, as shown in FIG. 4.

However, in the above ignition timing control, when the engine stalls after starting energization to the ignition coil and the reference position signal REF cannot be output, the ignition coil is energized until the current is interrupted after it is determined that the engine has stalled. As a result, the ignition coil is damaged by high temperature caused by the current.

A Japanese Patent Publication No. Heisei 10-47142, published on Feb. 17, 1998, exemplifies a previously proposed apparatus for controlling the ignition timing in an internal combustion engine. In the disclosure of the above-mentioned Japanese Patent Publication, when the crank angle sensor does not provide a usable detecting signal, the ignition timing is controlled by a detecting signal provided by the cam sensor. However, when the engine stalls after starting energization to the ignition coil and the reference position signal cannot be output, the ignition coil is energized until the current is interrupted after it is determined that the engine has stalled. As a result, the ignition coil is damaged by high temperature.

SUMMARY OF THE INVENTION

It is, therefore, an object of the present invention to provide an apparatus and method for controlling ignition timing in an internal combustion engine, and more particularly to a technique for detecting current control timing by determining a time from a standard position signal. Thus, if the engine stalls, the present invention can avoid the condition of energizing the ignition coil.

To satisfy the foregoing and other objects, an apparatus and corresponding method for controlling an ignition timing in an internal combustion engine is provided, comprising a cam sensor for generating a standard position signal at each standard piston position, and a position sensor for generating a single angle signal, and a control unit for controlling an ignition timing based on the standard position signal and the single angle signal, and a timer for detecting a time from the standard position signal before the ignition timing, and a device for setting an ignition-starting timing after said standard position signal when an engine rotation speed is less than a predetermined rotation speed.

DETAILED DESCRIPTION OF THE PREFERRED EMBODIMENT

Figure 1:
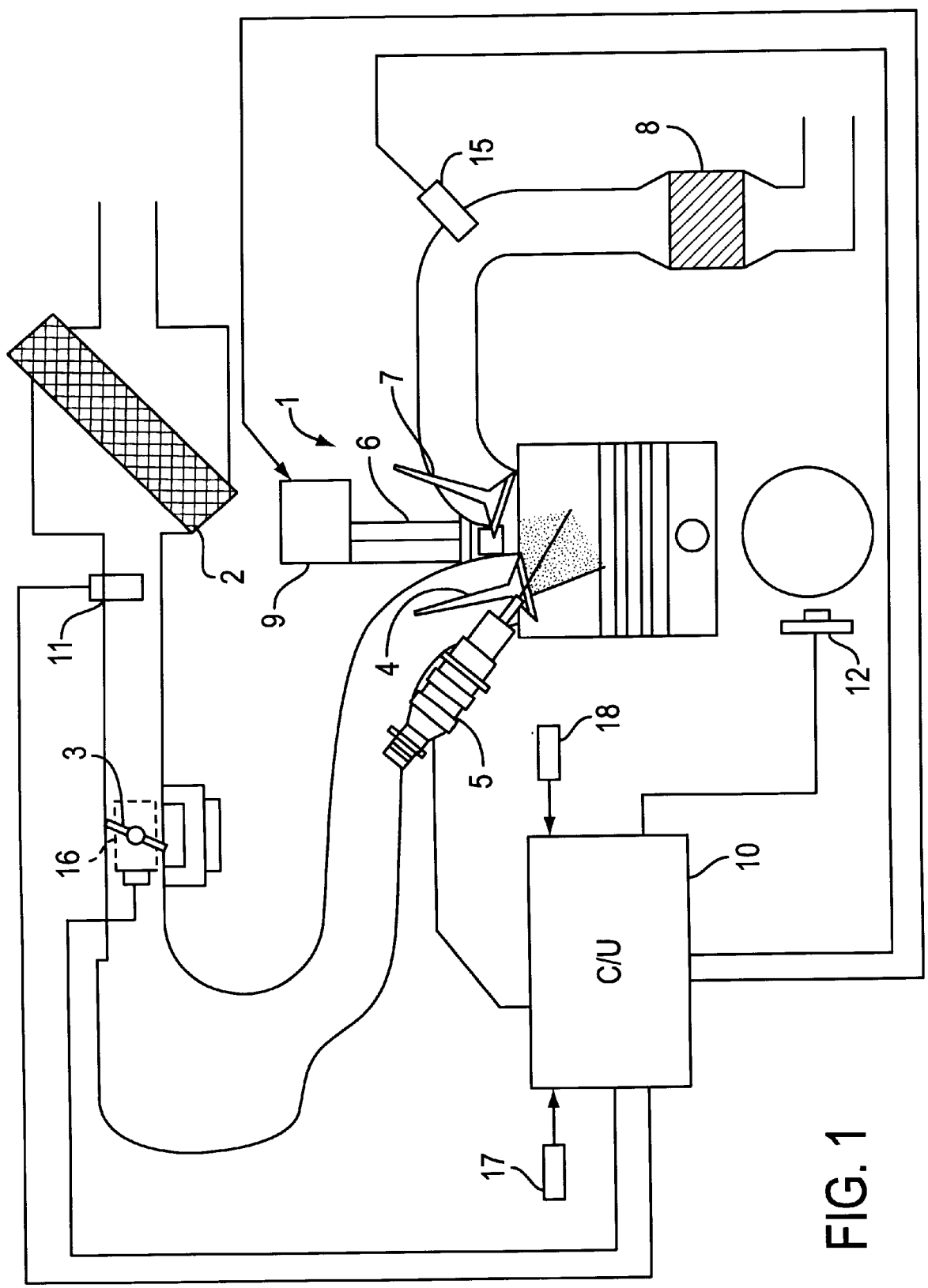
FIG. 1 is a system diagram of an apparatus for controlling an ignition timing in an internal combustion engine according to an embodiment of the present invention.

The present invention provides an apparatus for controlling ignition timing in an internal combustion engine as shown in FIG. 1. The present invention is adaptable to a spark-ignited gasoline engine having a direct injection system or port injection system.

In the internal combustion engine 1, intake air passing through an air cleaner 2 is adjusted by a throttle valve 3 and is aspirated into a cylinder through an intake valve 4. A fuel (gasoline) is injected directly into the cylinder by an injection valve 5 to form a fuel/air mixture. An ignition plug 6, which has an ignition coil 9 with a power transistor, ignites the fuel/air mixture. Exhaust gas is exhausted through an exhaust valve 7 and is cleaned by a catalyst 8.

A control unit 10 has a microcomputer that receives signals from sensors, which are installed in the internal combustion engine 1, and controls an amount of fuel injected by the fuel injection valve 5 and ignition timing of the ignition plug 6. The sensors include an air flow meter 11 for detecting an intake air amount Q in engine 1, an oxygen sensor 15 for detecting an air/fuel ratio corresponding to an oxygen concentration of the exhaust gas, a throttle sensor 16 for detecting an open angle (TVO) of the throttle valve 3, and a temperature sensor 17 for detecting a cooling-water temperature Tw. The sensors also include a position sensor 12 and a cam sensor 18, which are described below.

Figure 2:
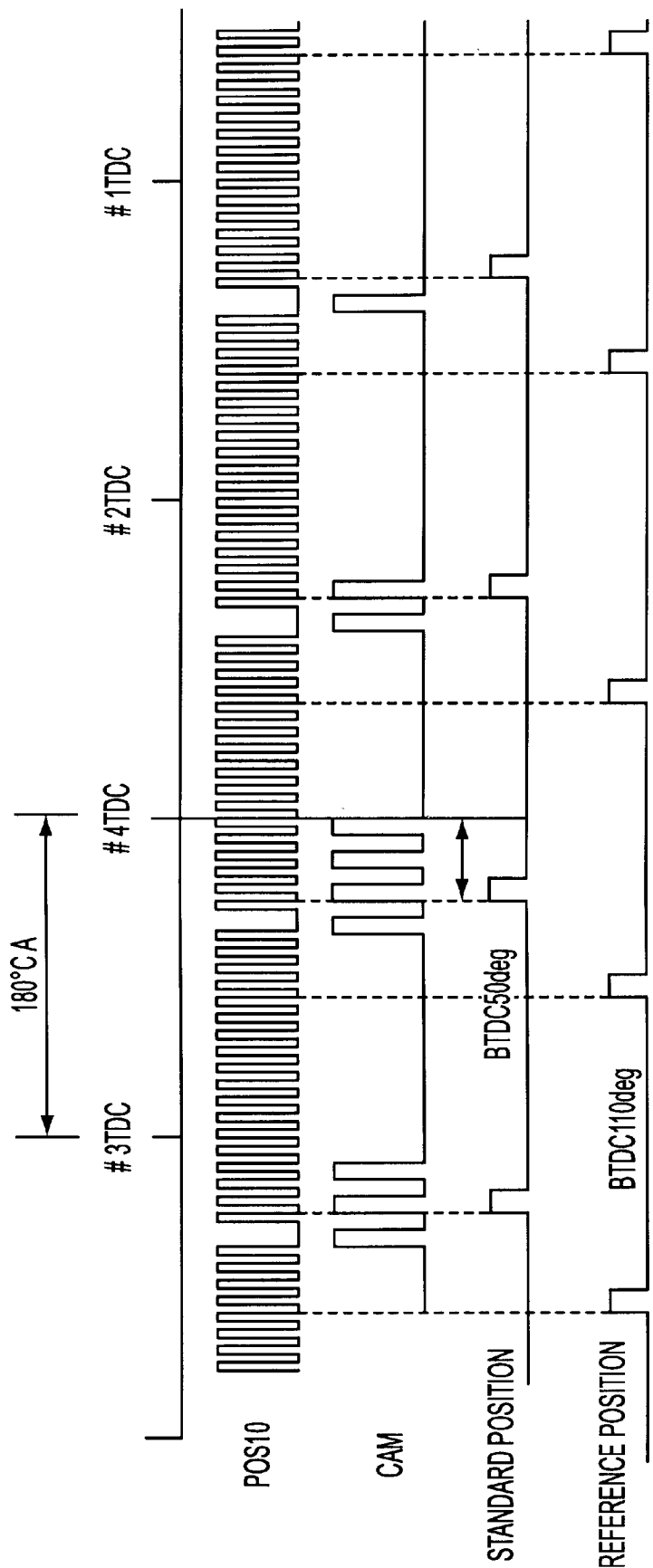
FIG. 2 is a time chart showing the signal characteristics of a cam sensor and a position sensor, and a reference position signal according to the embodiment of the present invention.

The position sensor 12 (single angle signal generating means) generates a detecting signal in synchronization with a rotation speed of a crankshaft by using a signal-plate, which is connected axially with the crankshaft. This detecting signal is a position signal POS10, which is produced for each 10° change in crank angle (a single crank angle). The position sensor 12 outputs the position signal POS10 relative to top dead center (TDC), but does not output a pulse (a position signal POS10) at 60° before top dead center (BTDC 60°), as shown in FIG. 2.

The cam sensor 18 generates a detecting signal in synchronization with a rotation speed of a camshaft by using a signal-plate, which is connected axially with the camshaft. This detecting signal is a pulse signal CAM having a number of pulses corresponding to a cylinder number. The pulse signal CAM is produced at each angle corresponding to a phase difference of the stroke of each cylinder. When the engine 1 is an in-line 4-cylinder engine, the phase difference of the stroke of each cylinder is 180° CA (crank angle). When the sequence of ignition control is #3→#4→#2→#1, the pulse signal CAM generated by the cam sensor 18 has 3 pulses→4 pulses→2 pulses→1 pulse on each 180° CA as shown in FIG. 2. A standard position signal is generated on each 180° CA at BTDC 50°.

Furthermore, the position sensor 12 can output the position signal POS10 corresponding to each single crank angle (10°). When the control unit 10 detects a high to low transition of the first pulse (or first position signal POS10), the first position signal POS10 is determined to correspond to a standard position of 50° before top dead center (BTDC 50°), as shown in FIG. 2. A reference position signal REF is output at BTDC 110° (i.e., 70° after top dead center (ATDC 70°)), which is positioned 12 position signals POS10 after the standard position BTDC 50°. As a result, ignition timing or fuel injection timing can be detected based on the reference position signal REF.

When the position sensor 12 is operating normally, the reference position signal REF is output at BTDC 110° (ATDC 70°) by detecting the first pulse of the cam sensor 18 and counting the number of position signals POS10, e.g., counting 12 pulses of position signal POS10. When ignition timing is detected based on counting the number of position signals POS10 after the reference position signal REF, the ignition timing control signal is output to the power transistor in the ignition coil 9 and ignition timing is controlled by the ignition plug 6. Also, an injection pulse signal is output to the fuel injection valve 5 by detecting injection timing.

Figure 3:
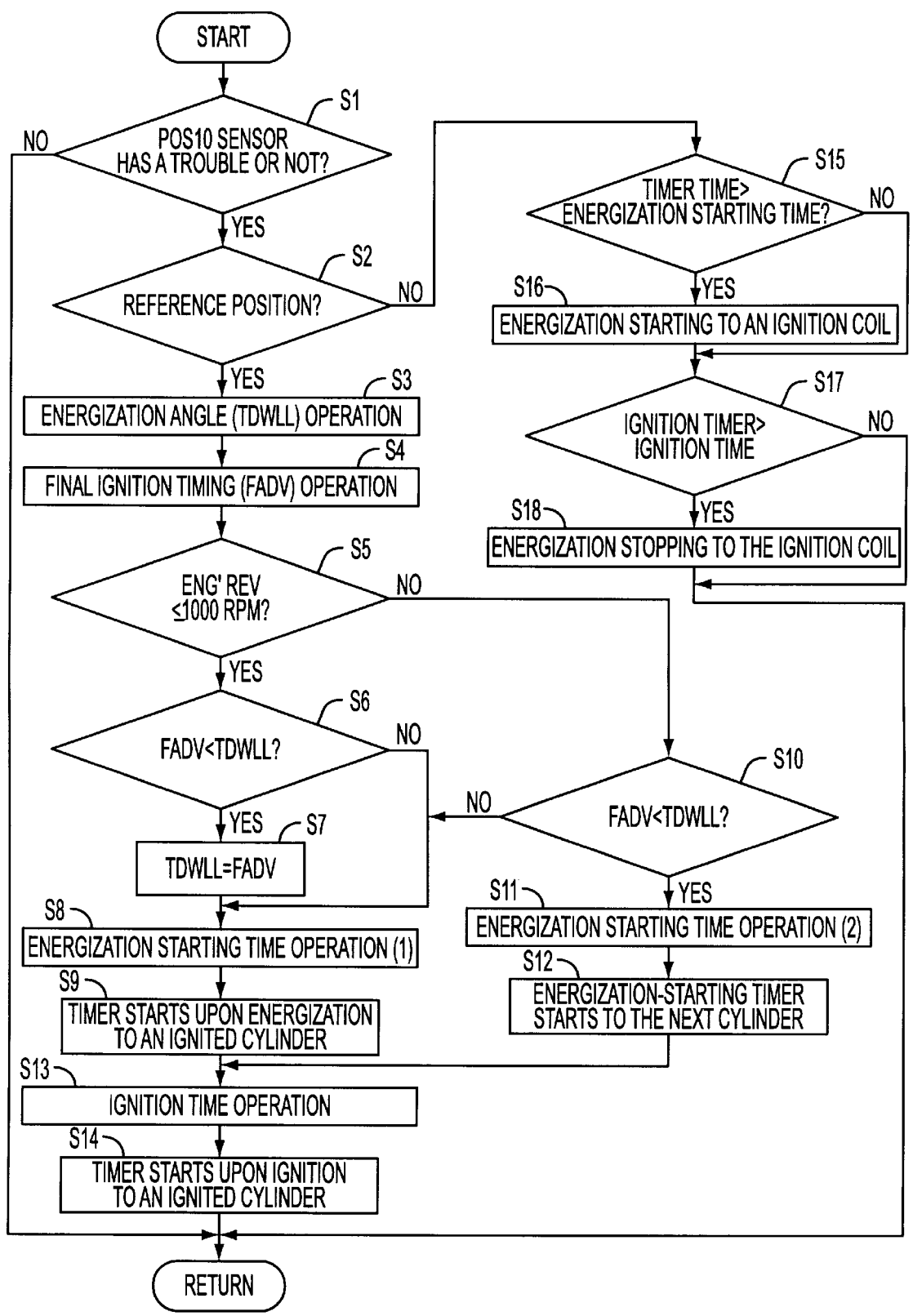
FIG. 3 is a flow chart showing ignition control when the position sensor is having trouble, according to the embodiment of the present invention.

On the other hand, when the position sensor 12 is having trouble (i.e., does not operate normally to produce a usable position signal POS10), ignition timing is controlled as shown in the flow chart of FIG. 3.

Step S1 judges whether the position sensor 12 is operating normally. For example, the position sensor 12 is diagnosed as not operating normally when a position signal POS10 is not output for more than a predetermined time even though the cam sensor 18 has output a detecting signal (pulse signal CAM).

If it is determined that the position sensor 12 is not having trouble, the apparatus operates in the typical manner described above. The process returns to Step S1, where it is again determined whether the position sensor 12 is operating normally.

When it is determined in Step Si that the position sensor 12 is having trouble, Step S1 goes to Step S2. Step S2 determines whether the cam sensor 18 has output a first pulse (reference position). This first pulse is determined by measuring a period of the detecting signal (pulse signal CAM) of the cam sensor 18. Furthermore, when the position sensor 12 is having trouble, the ignition timing of the ignition coil 9 is detected by measuring time based on the first pulse of the cam sensor 18. Then, the first pulse comprises a standard position signal and the cam sensor 18 comprises standard position signal generating means.

When the first pulse (the standard position signal) and BTDC 50° are detected in Step S2, Step S2 goes to Step S3. An energization angle TDWLL is determined in Step S3. When the position sensor 12 is operating normally, the energization angle TDWLL is determined by adding a predetermined angle (e.g., 30 degrees) to a normal energization angle based on engine rotation speed and battery voltage. It prevents a lack of the energization angle due to a time control error. When the position sensor is having trouble and the ignition timing is determined by time, the energization angle TDWLL cannot adapt to a rotation speed variation after a fixed determining time. Then, ignition energy can be maintained by correcting the energization angle TDWLL. Furthermore, the engine rotation speed can be determined by a period of the first pulse (the standard position signal).

A final ignition timing FADV is determined in Step S4. The final ignition timing FADV is an angle from the standard position signal to the ignition timing. An ignition angle advance value (ignition timing ADV) is determined based on engine load or engine rotation speed. The final ignition timing FADV is determined by subtracting the ignition timing ADV from a predetermined angle:

$$FADV=60-ADV.$$

In Step S5, it is determined whether the engine rotation speed REV is less than or equal to a predetermined rotation speed (e.g., 1000 rpm). When the engine rotation speed REV is less than or equal to the predetermined rotation speed, Step S5 goes to Step S6.

Figure 4:
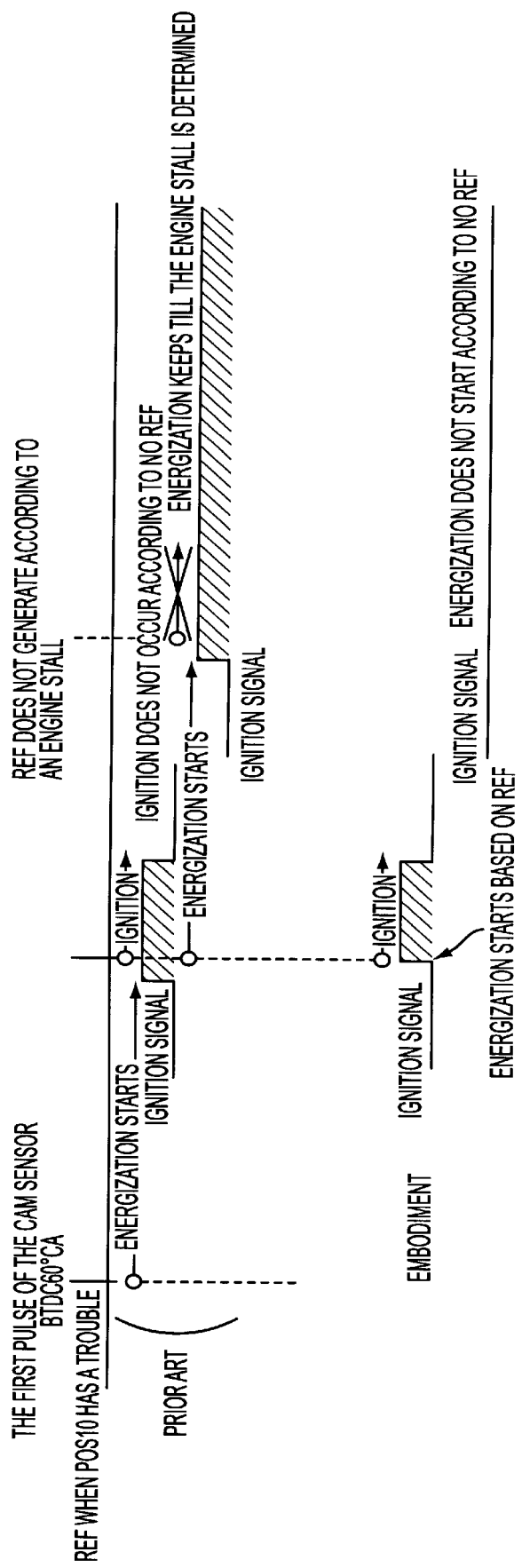
FIG. 4 is a time chart showing an energization control of an ignition coil according to the embodiment of the present invention, and a problem of a previously known control.

In Step S6, it is determined whether the final ignition timing FADV is less than the energization angle TDWLL. When the final ignition timing FADV is less than the energization angle TDWLL and energization starts before the first pulse (before the ignition timing), Step S6 goes to Step S7. In Step S7, the energization angle TDWLL is set to be equal to the final ignition timing FADV (the angle from the first pulse to the ignition timing). Therefore, energization starts at the first pulse as shown in FIG. 4.

In Step S5, when the engine rotation speed REV is less than or equal to the predetermined rotation speed, an ignition-starting timing starts after the first pulse (before the ignition timing). The ignition timing (the ignition-starting timing and ignition timing) is determined by measuring a time based on the first pulse (before the ignition timing). As a result, even if the engine stall occurs after the start of energization, the ignition timing can be detected and the ignition coil will not be left in the energized condition.

On the other hand, in Step S6, when the final ignition timing FADV is not less than the energization angle TDWLL and the energization can start at the first pulse before ignition timing or after the first pulse, Step S6 goes to Step S8. In Step 8, an ignition-starting timing (1) is given by the following expression:

$$\text{ignition-starting timing (1)}=(FADV-TDWLL)\times(\text{the first pulse period}/180),$$

where (FADV−TDWLL) is an angle from the first pulse to the ignition-starting timing.

An ignition-starting timer corresponding to a cylinder that is ignited on the first pulse, determines the ignition-starting timing (1) from the first pulse in Step S9.

On the other hand, when the engine rotation speed REV is more than the predetermined rotation speed in Step S5, Step S5 goes to Step S10. Step S10 judges whether the final ignition timing FADV is less than the energization angle TDWLL, as in Step S6. When the final ignition timing FADV is not less than the energization angle TDWLL in Step S10, Step S10 goes to Step S8. When the final ignition timing FADV is less than the energization angle TDWLL, Step S10 goes to Step S11.

In Step S11, an ignition-starting timing (2) is given by the following expression:

ignition-starting timing (2)=(180−FADV−TDWLL)×(the first pulse period/180).

When the energization angle TDWLL is more than the final ignition timing FADV, the ignition-starting timing must be based on the former first pulse (i.e., before the first pulse corresponding to the ignition timing). Then, the ignition-starting timing (2) is determined by a time from the former first pulse, i.e., before the ignition-starting timing.

The ignition-starting timer corresponding to a cylinder, which is ignited on the next first pulse, determines the ignition-starting timing (2) in Step S12.

An ignition time is determined in Step S13. The ignition time is the time from the first pulse to the ignition timing, which is determined by the following expression:

ignition time=FADV×(the first pulse period/180).

An ignition timer corresponding to the cylinder, which is ignited on the next first pulse starts in Step S14.

When the reference position is not the first pulse in Step S2, Step S2 goes to Step S15. When the time determined by the ignition-starting timer is more than the ignition-starting timing in Step S15, Step S15 goes to Step S16. Energization to the ignition coil corresponding to the cylinder starts in Step S16.

When the time determined by an ignition timer is more than the ignition time in Step S17, Step S17 goes to Step S18. An energization to the ignition coil 9 corresponding to the cylinder is interrupted and ignition energy is no longer generated.

The entire contents of Japanese Patent Application No. TOKUGANHEI 10-237656, filed Aug. 24, 1998, is incorporated herein by reference.

The foregoing description of a preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. An apparatus for controlling ignition timing in an internal combustion engine, comprising:

a cam sensor for generating a standard position signal for each standard piston position;

a position sensor for generating a single angle signal; and a control unit for controlling ignition timing based on at least said single angle signal when said position sensor is operating normally and for controlling ignition timing based on at least said standard position signal when said position sensor is not operating normally, and for setting an ignition-starting timing, wherein the control unit sets the ignition-starting timing after said standard position signal when the position sensor is not operating normally and an engine rotation speed is less than a predetermined rotation speed.

2. An apparatus for controlling ignition timing in an internal combustion engine according to claim 1, wherein a final ignition timing FADV is an angle from said standard position signal to an ignition timing, and the control unit makes an energization angle TDWLL equal to the final ignition timing FADV when the position sensor is not operating normally, and an engine rotation speed is less than or equal to a predetermined rotation speed, and said final ignition timing FADV is less than said energization angle TDWLL.

3. An apparatus for controlling ignition timing in an internal combustion engine, comprising:

a cam sensor for generating a standard position signal for each standard piston position;

a position sensor for generating a single angle signal; and a control unit for controlling ignition timing based on at least said single angle signal when said position sensor is operating normally and for controlling ignition timing based on at least said standard position signal when said position sensor is not operating normally, and for setting an ignition-starting timing, wherein FADV is a final ignition timing, TDWLL is an energization angle, and said ignition-starting timing is given by the expression:

ignition-starting timing=(FADV−TDWLL)×(a standard position signal period/180), when the position sensor is not operating normally, an engine rotation speed is less than or equal to a predetermined rotation speed, and said final ignition timing FADV is greater than or equal to said energization angle TDWLL.

4. An apparatus for controlling ignition timing in an internal combustion engine, comprising:

a cam sensor for generating a standard position signal for each standard piston position;

a position sensor for generating a single angle signal; and a control unit for controlling ignition timing based on at least said single angle signal when said position sensor is operating normally and for controlling ignition timing based on at least said standard position signal when said position sensor is not operating normally, and for setting an ignition-starting timing, wherein FADV is a final ignition timing, TDWLL is an energization angle, and said ignition-starting timing is given by the expression:

ignition-starting timing=(180−FADV−TDWLL)×(a standard position signal period/180), when the position sensor is not operating normally, an engine rotation speed is greater than a predetermined rotation speed, and said final ignition timing FADV is less than said energization angle TDWLL.

5. A method for controlling ignition timing in an internal combustion engine, comprising the steps of:
  generating a standard position signal for each standard piston position based on a position of a camshaft;
  generating a single angle signal;
  controlling ignition timing based on said standard position signal and said single angle signal;
  detecting time from said standard position signal before said ignition timing to control an ignition-starting timing; and
  setting said ignition-starting timing after said standard position signal when rotation speed of the engine is less than a predetermined rotation speed.

6. An apparatus for controlling ignition timing in an internal combustion engine, comprising:
  a standard position signal generating means for generating a standard position signal for each standard piston position;
  a single angle signal generating means for generating a single angle signal;
  a control unit for controlling an ignition timing based on said standard position signal and said single angle signal;
  a timer for detecting a time from said standard position signal before said ignition timing; and
  means for setting an ignition-starting timing after said standard position signal when an engine rotation speed is less than a predetermined rotation speed.

* * * * *